(12) United States Patent
Tang

(10) Patent No.: US 7,593,237 B2
(45) Date of Patent: Sep. 22, 2009

(54) EXPANSION CARD RETENTION ASSEMBLY

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/126,991

(22) Filed: May 26, 2008

(65) Prior Publication Data

US 2009/0168376 A1    Jul. 2, 2009

(30) Foreign Application Priority Data

Dec. 27, 2007   (CN)   .......................... 2007 1 0203447

(51) Int. Cl.
*H05K 7/12*    (2006.01)
(52) U.S. Cl. ...................... 361/801; 361/726; 361/732; 361/747; 361/759; 312/223.2
(58) Field of Classification Search ................ 361/726, 361/732, 747, 759, 801; 312/223.1, 223.2
See application file for complete search history.

(56) References Cited

U.S. PATENT DOCUMENTS

| | | | | |
|---|---|---|---|---|
| 6,809,922 B2* | 10/2004 | Lin et al. | ................. | 361/679.4 |
| 6,834,766 B2* | 12/2004 | Lin et al. | ................. | 211/41.17 |
| 6,960,720 B2* | 11/2005 | Wen-Lung | ................... | 174/50 |
| 2007/0242442 A1* | 10/2007 | Dai | ............................ | 361/801 |

* cited by examiner

*Primary Examiner*—Dameon E Levi
(74) *Attorney, Agent, or Firm*—Zhigang Ma

(57) ABSTRACT

An exemplary retention assembly (30) is used to assemble an expansion card. The expansion card is mounted to an expansion card bracket (22) attached to an enclosure (24). The retention assembly includes a foldable holder (32) and a fixing module (34, 36). The fastening module is fixed to the enclosure. The foldable holder is rotatably connected to the fastening module. The foldable holder is configured for resisting the expansion card bracket when the retention assembly being in a closed state and being away from the expansion card bracket when the retention assembly is in an opened state. One of the fastening module and the foldable holder forms a protrusion (325), the other one of the fastening module and the foldable holder defines at least two spaced positioning depressions (366) for engaging with the protrusion.

17 Claims, 6 Drawing Sheets

EXPANSION CARD RETENTION ASSEMBLY

BACKGROUND OF THE INVENTION

1. Field of the Invention

The present invention generally relates to retention assemblies for securing a plurality of expansion cards in an electronic device enclosure.

2. Discussion of the Related Art

Referring now to FIG. 6, a typical retention assembly for securing an expansion card to an electronic device enclosure 13 is shown. The retention assembly includes a catching plate 11, a plurality of bolts 12, and a plurality of covers 14. An expansion slot (not labeled) is defined in the electronic device enclosure 13. A bulge 132 is formed surrounding a periphery of the expansion slot. The covers 14 are configured for covering the expansion slot and securing/protecting the expansion cards. Each of the covers 14 is an elongated piece having a bent portion (not labeled) adjoining to the bulge 132. When an expansion card is fixed to the electronic device enclosure 13, the catching plate 11 is positioned on the bent portions of the covers 14, and is fixed on the electronic device enclosure 13 by the bolts 12, thereby fastening the covers 14 to the electronic device enclosure 13.

In the above retention assembly, the covers 14 are secured to the electronic device enclosure 13 by using the bolts 12. However, installing or removing the bolts 12 is unduly time-consuming and laborious. This leads to lower efficiency of installation and removal of expansion cards. In addition, a tool for installing or removing bolts is needed in installation or removal. These problems are multiplied in mass production facilities. Furthermore, when used for a period of time, bolts 12 and the screw holes cannot reliably engaged with each other any more.

Therefore, a new retention assembly which overcomes the above-described shortcomings is desired.

SUMMARY

An exemplary retention assembly is used to assemble an expansion card mounted to an expansion card bracket to an enclosure. The retention assembly includes a foldable holder and a fastening module. The fastening module is fixed to the enclosure. The foldable holder is rotatably connected to the fastening module. The foldable holder is configured for resisting the expansion card bracket when the retention assembly being in a closed state and being away from the expansion card bracket when the retention assembly being in an opened state. One of the fastening module and the foldable holder forms a protrusion, the other one of the fastening module and the foldable holder defines at least two spaced positioning depressions for engaging with the protrusion.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the retention assembly. Moreover, in the drawings, like reference numerals designate corresponding parts throughout the several views.

DETAILED DESCRIPTION OF THE EMBODIMENTS

Figure 1:
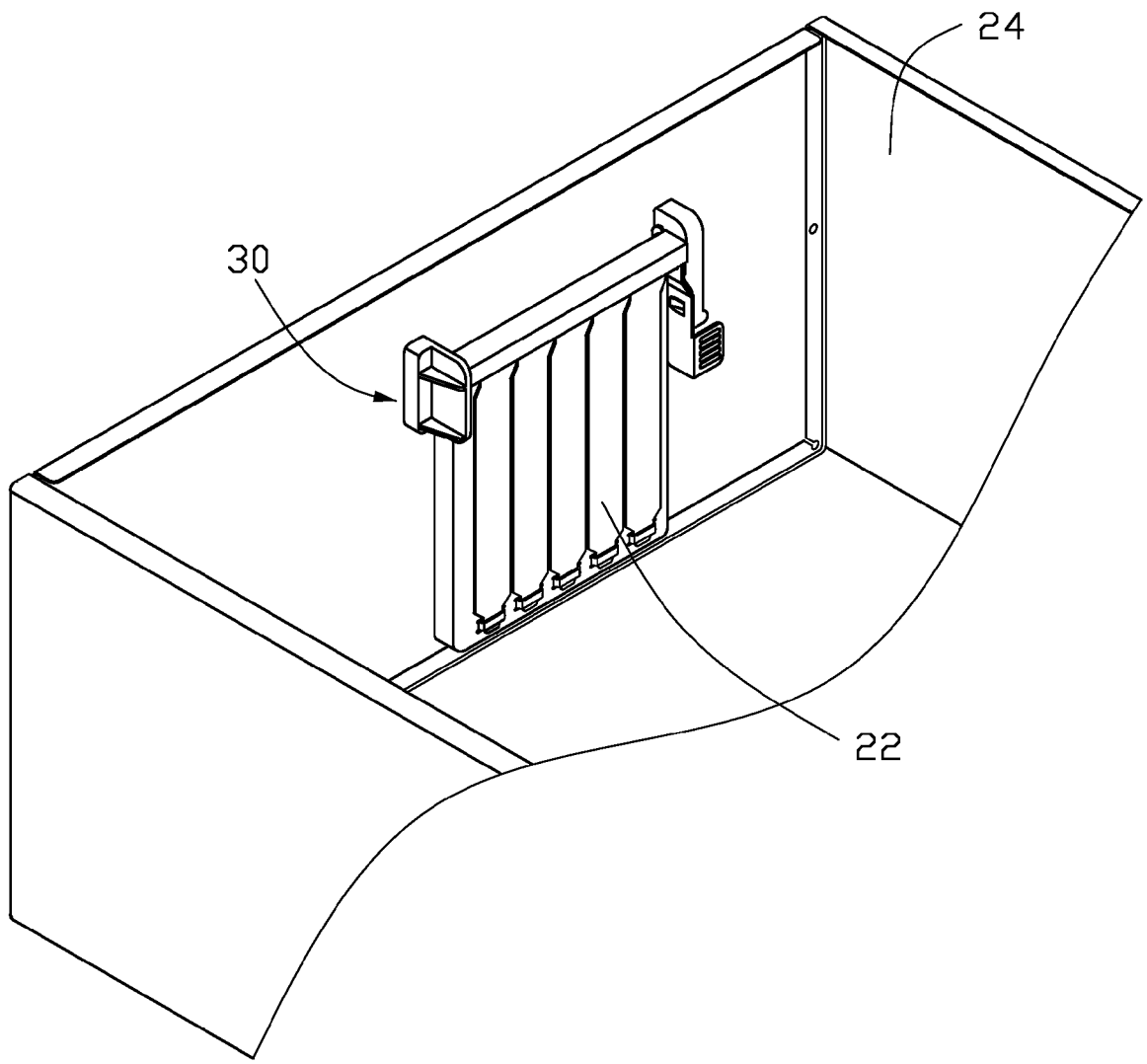
FIG. 1 is an assembled, isometric view of a retention assembly in accordance with an exemplary embodiment of the present invention, showing the retention assembly assembled to an enclosure.

Referring to the drawings in detail, FIG. 1 shows a retention assembly 30 of an exemplary embodiment of the present invention assembled in one wall of an enclosure 24 such as an electronic device enclosure. The retention assembly 30 is configured to fasten expansion card brackets of expansion cards (not shown) to an expansion card seat of the enclosure 24.

Figure 2:
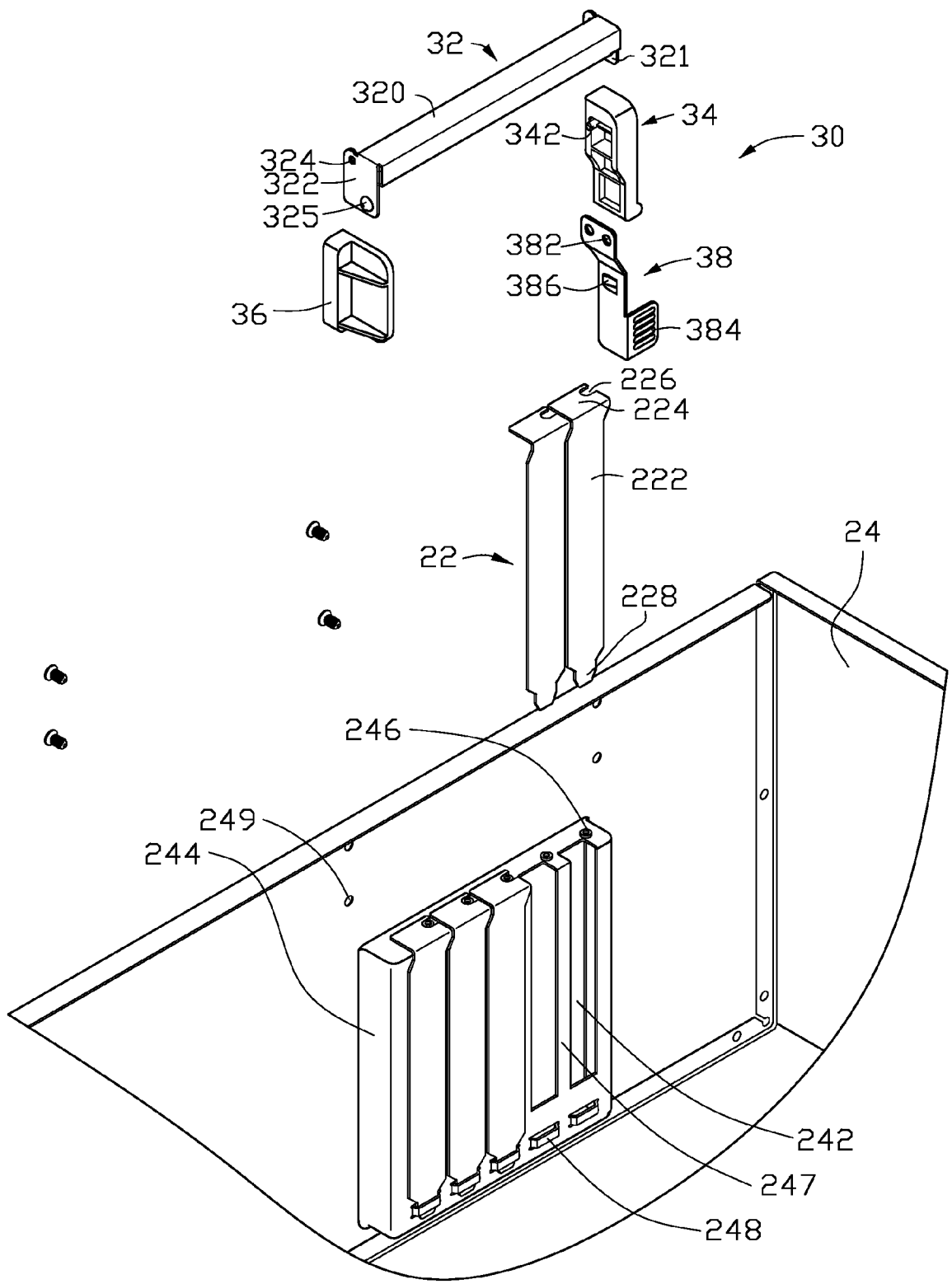
FIG. 2 is a partially exploded, isometric view of the retention assembly and the enclosure of FIG. 1.

For the exemplary purposes, only one expansion bracket 22 and one expansion card seat will be detailed to more clearly describe the exemplary embodiment. Referring to FIG. 2, the expansion card bracket 22 includes an elongated main portion 222 and a fastening portion 224 extending perpendicularly from an end of the elongated main portion 222. An edge of the fastening portion 224 defines a notch 226 correspondingly. The expansion card bracket 22 further includes a tab 228 extending from another end of the elongated main portion 222 opposite to the fastening portion 224. A width of the tab 228 is smaller than that of the main portion 222.

The enclosure 24 includes an expansion card platform (rack) 244. The platform 244 extends perpendicularly inwards forming at least one expansion card seat 247. For the exemplary purposes, only one expansion card seat 247 will be described to clearly disclose the exemplary embodiment. The expansion card seat 247 defines a cutout 242 extending from a first side of the platform 244 to a second side of the platform 244. The expansion card seat 247 further forms a positioning member 246 on a first surface and corresponding to the cutout 242, and a hooking member 248 adjacent to a second surface and corresponding to the cutout 242. The positioning member 246 is configured to be received in the notch 226 and the hooking member 248 is configured to be insertable by the tab 228. In the illustrated embodiment, the platform 244 is substantially rectangular in shape, and has four surfaces including the first surface and the second surface opposite to each other.

Figure 3:
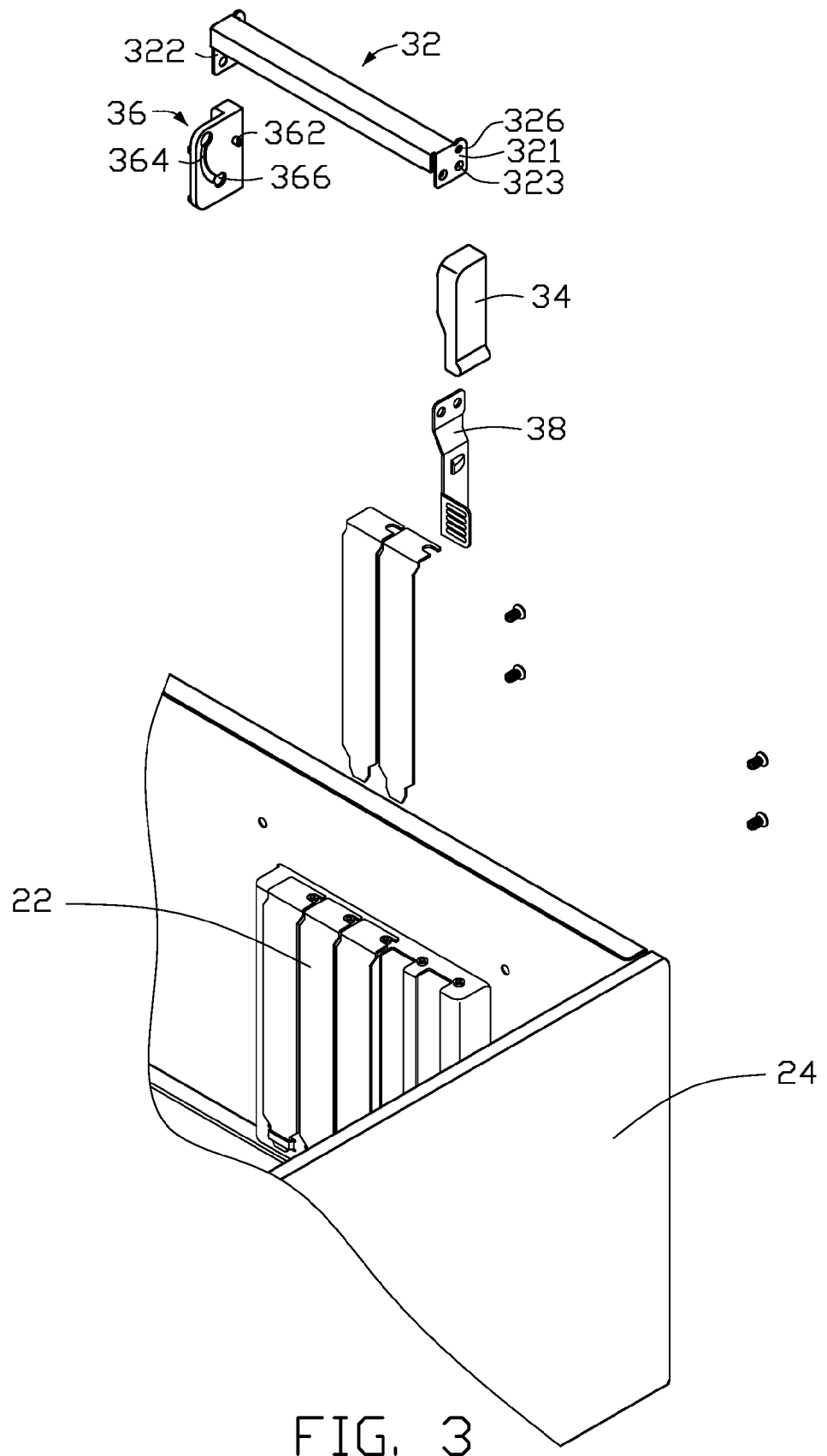
FIG. 3 is similar to FIG. 2, but viewed from another aspect.

Referring to FIGS. 2 and 3, the retention assembly 30 includes a foldable holder 32, a first fastening member 34, a second fastening member 36, and a handle 38.

Figure 4:
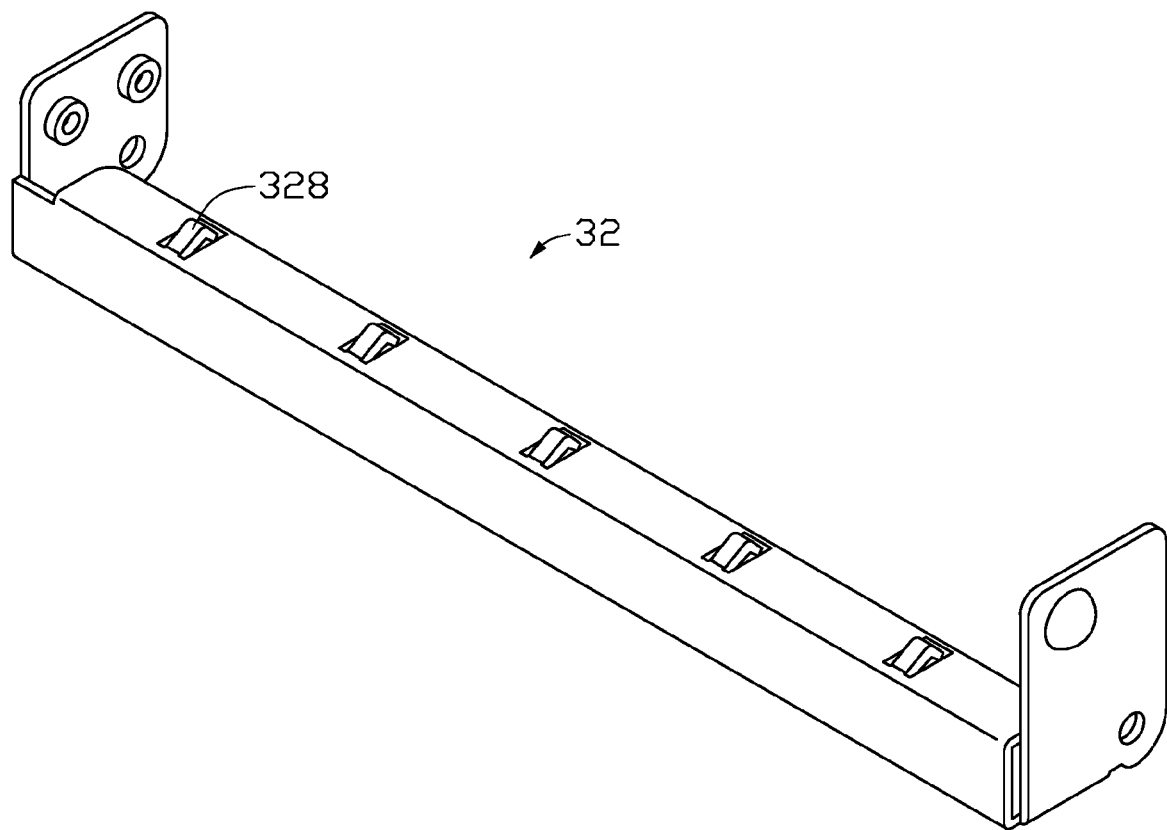
FIG. 4 is an isometric view of a foldable holder of the retention assembly of FIG. 1, viewed from a third aspect.

The foldable holder 32 is an elongated frame having a length corresponding to that of the first surface of the enclosure 24. The foldable holder 32 includes a resisting portion 320 and two extending portions 321, 322 formed at opposite ends of the resisting portion 320. The extending portion 321 defines a pivot hole 326 and includes two poles 323 extending inwards. The poles 323 are formed by punching the extending portion 321, thereby defining two holes (not labeled) at an outside surface of the extending portion 321 correspondingly. The extending portion 322 defines a pivot hole 324 corresponding to the pivot hole 326 of the extending portion 321. The extending portion 322 further includes a protrusion 325 extending outwards. Referring to FIG. 4, a surface of the foldable holder 32, for resisting the expansion card brackets 22, forms a plurality of spaced, elastic pressing portions 328.

In this embodiment, there are five pressing portions 328 corresponding to an amount of the expansion card brackets 22.

The first fastening member 34 is a block having a cylindrical pivot shaft 342. The second fastening member 36 is also a block having a cylindrical pivot shaft 362. The pivot shafts 342, 362 are configured for being inserted into the pivot holes 326, 324 of the foldable holder 32 correspondingly. Thus, the foldable holder 32 is rotatably connected to the fastening members 34, 36. The second fastening member 36 further defines a circular-shaped guiding groove 364. The guiding groove 364 is substantially an arc of a circle having a center at the pivot shaft 362. Two positioning depressions 366 with a depth and a width larger than that of the guiding groove 364 are defined at ends of the guiding groove 364.

The handle 38 is a bended piece defining two through holes 382 at an end and forming a protruding piece 384 at a side adjacent to an opposite end. An elastic piece 386 is formed in a middle portion of the handle 38 mainly by punching. The poles 323 are configured to be inserted into the through holes 382 correspondingly, and subsequently riveted, thus the handle 38 can be fixed to the foldable holder 32.

To assemble the retention assembly 30, the handle 38 is fixed to the foldable holder 32. The pivot shafts 342, 362 of the fastening members 34, 36 are inserted into the pivot holes 326, 324 of the foldable holder 32 correspondingly, thereby rotatably connecting the foldable holder 32 to the fastening members 34, 36. The elastic piece 386 of the handle 38 extends toward the first fastening member 34. The protrusion 325 is slidably received in the guiding groove 364 of the second fastening member 36. The fastening members 34, 36 are fixed to the enclosure 24.

In use, the retention assembly 30 has two states, an opened state and a closed state. In the closed state, the retention assembly 30 holds the expansion card, if any, in the enclosure 24, the tab 228 of the expansion card bracket 22 is inserted into the holding piece 248 and the cutout 226 of the expansion card bracket 22 is engaged with the positioning member 246. The foldable holder 32 presses the fixing portion 224 of the expansion card bracket 22. In the closed state, the protrusion 325 is positioned in one of the positioning depressions 366 of the second fastening member 36 and the elastic piece 386 of the handle 38 resists the first fastening member 34, thus restricting the handle 38 from rotating arbitrarily, and firmly positioning the foldable holder 32 in a predetermined position.

Figure 5:
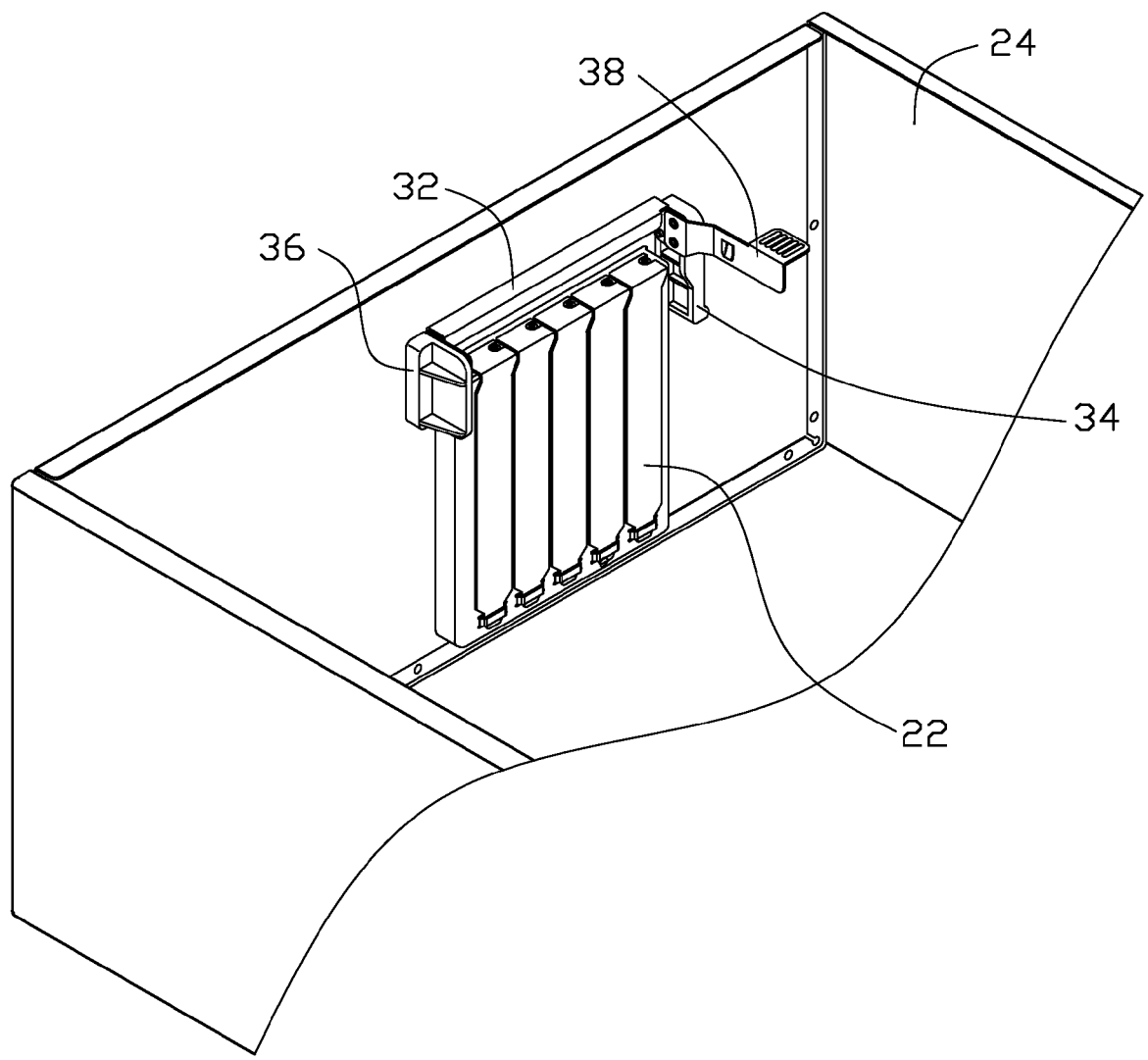
FIG. 5 is similar to FIG. 1, but showing an open state of the retention assembly.
Figure 6:
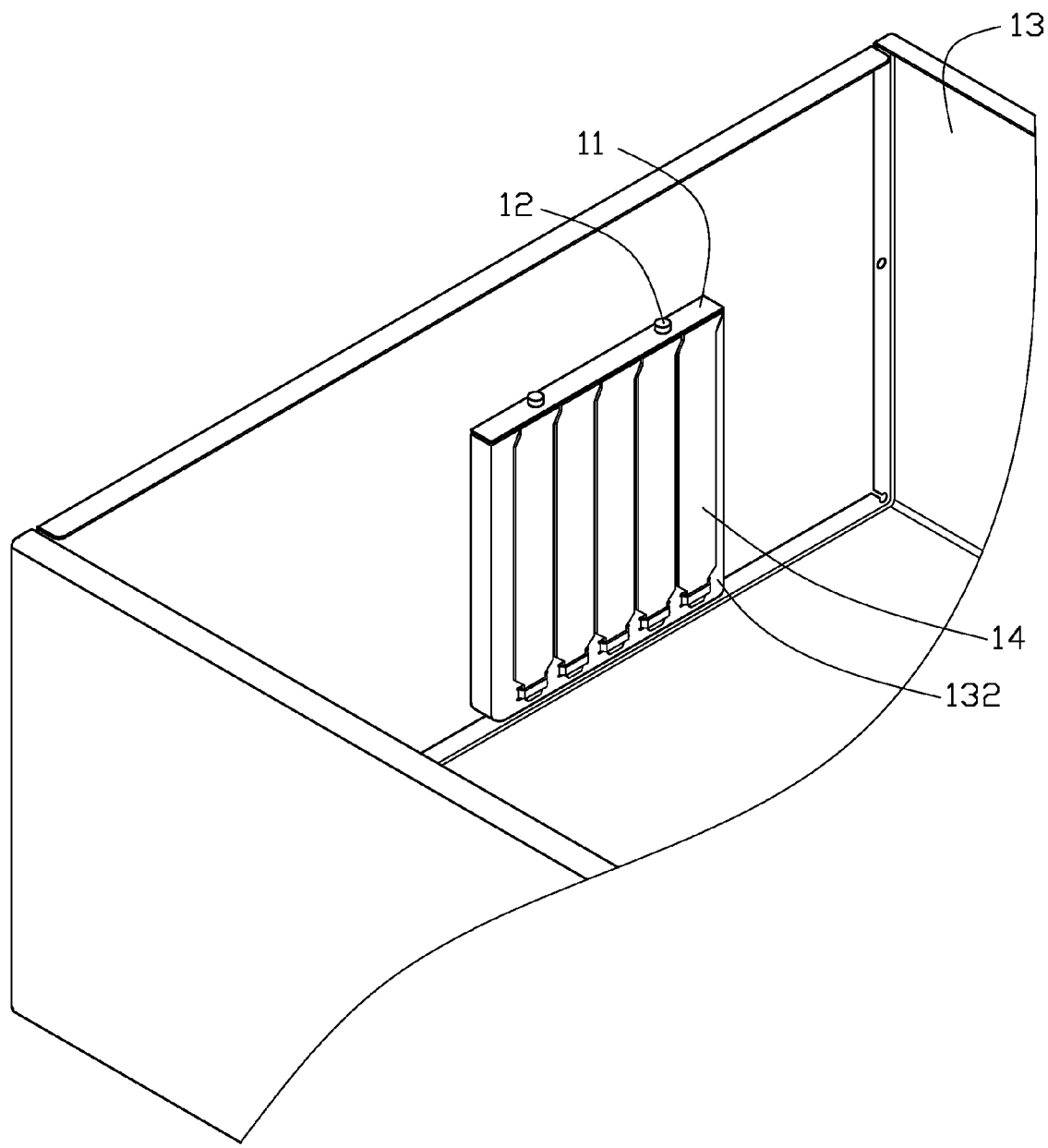
FIG. 6 is an assembled, isometric view of a conventional retention assembly assembled to an enclosure.

Referring to FIG. 5, to add or remove extra expansion cards, the retention assembly 30 is pulled from the closed state to the opened state. The handle 38 is rotated manually from a closed position to an opened position. The foldable holder 32 rotates together with the handle 38 relative to the pivot shafts 342, 362. Thus, the foldable holder 32 is flipped away from the fixing portion 224 of the expansion card bracket 22. When the foldable holder 32 rotates to an angle about 90 degrees, the expansion card bracket 22 can be detached from or installed to the enclosure 24 correspondingly, thereby removing expansion cards from or installing expansion cards to the enclosure 24. In the opened state, the protrusion 325 of the foldable holder 32 is positioned in the other positioning depression 366 of the second fastening member 36, thus the foldable holder 32 cannot rotate arbitrarily by itself. When the expansion card brackets 22 have been installed onto or detached from the enclosure 24, the handle 38 is rotated back to the closed state, thus the foldable holder 32 rotates together with the handle 38 to hold the expansion card brackets 22, in place. In the closed state, the pressing portions 328 of the foldable holder 32 resist the expansion card brackets 22 correspondingly. Even when multiple expansion card bracket 22 having different thickness are slotted into the platform 24, the expansion card brackets 22 can be held firmly because of the elasticity of the pressing portions 328. Alternatively, the pressing portions 328 may be omitted when the thicknesses of the expansion card brackets 22 are the same.

Alternatively, the fastening members 34, 36 may be fixed to the enclosure 24 by using various means such as welding, riveting or screwing. In this embodiment, the fastening members 34, 36 are fixed by screwing as follows: the enclosure 24 defines a plurality of through holes 249, and the fastening members 34, 36 define a plurality of thread holes (not shown). A plurality of bolts (not labeled) are provided to engage in the through holes 249 of the enclosure 24 and the thread holes of the fastening members 34, 36. The fastening members 34, 36 may be a part of the enclosure 24. The fastening members 34, 36 may be an integrated fastening module.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A retention assembly for assembling an expansion card, the expansion card being mounted to an expansion card bracket attached to an enclosure, the retention assembly comprising:

a fastening module for being fixed to the enclosure, the fastening module comprising a first fastening member and a second fastening member; and a foldable holder rotatably connected to the fastening module, the foldable holder comprising a resisting portion and two extending portions formed at opposite ends of the resisting portion, and the foldable holder configured to resist the expansion card bracket when the retention assembly is in a closed state and being away from the expansion card bracket when the retention assembly is in an opened state;

wherein one of one extending portion of the fastening module and the second fastening member of the foldable holder forms a protrusion, the other one of the extending portion and the second fastening member defines at least two spaced positioning depressions and a circular-shaped guiding groove, the guiding groove substantially having a curvature of a circle having a center, the positioning depressions being at ends of the guiding groove, a depth and a width of the positioning depressions is larger than that of the guiding groove, the protrusion slidably engages in the guiding groove, and the foldable holder is positioned relative to the fastening module when the protrusion engages in each of the positioning depressions.

2. The retention assembly as claimed in claim 1, wherein the foldable holder is an elongated frame, each extending portion defines a pivot hole, and each fastening member forms a pivot shaft for rotatably engaging in the pivot holes correspondingly.

3. The retention assembly as claimed in claim 2, further comprising a handle, and the handle is fixed to the foldable holder.

4. The retention assembly as claimed in claim 3, wherein the handle forms an elastic piece for resisting one of the fastening members.

5. The retention assembly as claimed in claim 3, wherein one of the extending portions forms two poles extending inwards, the handle defines two through holes, and the poles of the foldable holder are inserted into the through holes for fixing the handle to the foldable holder.

6. The retention assembly as claimed in claim 5, wherein the handle forms a protruding piece at an end opposite to the through holes.

7. The retention assembly as claimed in claim 2, wherein the protrusion is formed on one of the extending portions outwards, the second fastening member defines the guiding groove and the positioning depression.

8. The retention assembly as claimed in claim 1, wherein the foldable holder forms at least one elastic pressing portion and each elastic pressing portion resiliently resists an expansion card bracket.

9. The retention assembly as claimed in claim 1, wherein each expansion card bracket comprises an elongated main portion, a fastening portion formed at an end of the main portion, and a tab formed at an opposite end of the main portion, the fastening portion defines a notch at an edge, the enclosure comprises an expansion card platform, the platform extends perpendicularly inwards forming at least one expansion card seat, the expansion card seat defines a cutout extending from a side of the platform to a second side of the platform, the expansion card seat further forms a positioning member on a first surface corresponding to the cutout, and a hooking member adjacent to a second surface opposite to the first surface and corresponding to the cutout, the positioning member is configured to be received in the notch and the booking member is configured to be insertable by the tab, and the fastening portion of each expansion card bracket is held between one sidewall and the foldable holder.

10. The retention assembly as claimed in claim 1, wherein the platform of the enclosure is substantially rectangular, and has four surfaces including the first surface and the second surface.

11. A retention assembly for assembling an expansion card, the expansion card being mounted to an expansion card bracket attached to an enclosure, the retention assembly comprising:
a fixing portion fixed relative to the enclosure, the fixing portion comprising a first fastening member and a second fastening member, the second fastening member having one of a protrusion and two positioning depressions; and
a foldable holder being rotatable relative to the fixing portion, the foldable holder comprising a resisting portion and two extending portions formed at opposite ends of the resisting portion, and one of the extending portions of the foldable holder having the other one of a protrusion and two positioning depressions;
wherein when the retention assembly latches the expansion card to the enclosure, the foldable holder abuts the expansion card bracket, the protrusion engages with one of the two positioning depressions so as to prevent the foldable holder from rotating arbitrarily, when the retention assembly unlatches the expansion card from the enclosure, the foldable holder is pulled to rotate relative to the enclosure, the protrusion engages with the other one of the two positioning depressions, a circular-shaped guiding groove is also defined connecting with the two positioning depressions, the guiding groove substantially has a curvature of a circle having a center, a depth and a width of the positioning depressions is larger than that of the guiding groove, the protrusion is slidably engaged in the guiding groove, and the foldable holder is positioned relative to the fixing portion when the protrusion engages in each of the positioning depressions.

12. The retention assembly as claimed in claim 11, wherein the foldable holder is an elongated frame, each extending portion defines a pivot hole, and each fastening member forms a pivot shaft for rotatably engaging in the pivot holes correspondingly.

13. The retention assembly as claimed in claim 12, further comprising a handle, the handle is fixed to the foldable holder.

14. The retention assembly as claimed in claim 12, wherein the protrusion is formed on one of the extending portions outwards, the second fastening member defines the guiding groove and the positioning depression.

15. The retention assembly as claimed in claim 14, wherein the handle forms an elastic piece for resisting one of the fastening members.

16. The retention assembly as claimed in claim 11, wherein the foldable holder forms at least one elastic pressing portion, and each elastic pressing portion resiliently resists one of the expansion card brackets.

17. The retention assembly as claimed in claim 11, wherein each expansion card bracket comprises an elongated main portion, a fastening portion formed at an end of the main portion, and a tab formed at an opposite end of the main portion, the fastening portion defines a notch at an edge, the enclosure comprises an expansion card platform, the platform extends perpendicularly inwards forming at least one expansion card seat, the expansion card seat defines a cutout extending from a side of the platform to a second side of the platform, the expansion card seat further forms a positioning member on a first surface corresponding to the cutout, and a hooking member adjacent to the second surface and corresponding to the cutout, the positioning member is configured to be received in the notch and the hooking member is configured to be insertable by the tab, and the fastening portion of each expansion card bracket is held between one sidewall and the foldable holder.

\* \* \* \* \*